Patented Nov. 27, 1928.

1,693,369

UNITED STATES PATENT OFFICE.

PAUL B. COCHRAN, OF WILKINSBURG, PENNSYLVANIA, ASSIGNOR TO WESTINGHOUSE ELECTRIC & MANUFACTURING COMPANY, A CORPORATION OF PENNSYLVANIA.

HEAT-RESPONSIVE MATERIAL.

No Drawing. Application filed April 21, 1927. Serial No. 185,665.

My invention relates to compositions of matter and particularly to compositions that are responsive to temperature changes.

It is among the objects of my invention to provide a material that will indicate the changes in temperature when it is heated and will return to its original color when cooled.

Another object of my invention is to provide a heat-responsive material that is waterproof and that will withstand weathering.

Hitherto it was known that the double iodide of mercury and copper would change color when it was heated and water-soluble coating compositions containing the compounds of mercury and copper were suggested. The water-soluble compositions change from the characteristic bright red color of the double iodide to a darker color or to a brown color at about 87° C.

Such compositions, particularly when in the form of a paint, were useful for many purposes, but where they were exposed to weathering, or to oil, the soluble material was not sufficiently permanent. Furthermore, the usefulness of the material was limited by its rather high transformation temperature.

My invention provides a material that will change color at about 65° C. The low temperature at which the transformation point occurs makes my new material useful, for example, as a safety device when it is in the form of a paint for covering the whole or portions of apparatus which operate best at comparatively low temperatures or apparatus in which liquids having a low boiling point are to be processed. Another use of the material is for covering parts of machinery that are likely to become heated in order to indicate when it is being operated at an unsafe temperature.

My paint consists of a pigment comprising a composition of cuprous iodide and mercuric iodide and a lacquer or varnish vehicle. Although the proportions of the constituents of the pigment may be varied and other inert material may be incorporated in the pigment, I prefer to combine the cuprous iodide and mercuric iodide in the proportions of 30% cuprous iodide to 70% mercuric iodide. The amount of vehicle used may also be varied within broad limits depending upon whether a liquid or a plastic compound is desired. For the purpose of making a paint, a convenient mixture is twenty-five parts of the prepared pigment and seventy-five parts of the vehicle.

The pigment is prepared by thoroughly mixing cuprous iodide and mercuric iodide with or without the addition of an inert material. The iodide salts may be mixed conveniently by grinding them together for one to four hours in a ball-mill or in an edge-runner. When thoroughly mixed and ground, the pigment is an extremely fine powder, ready to be incorporated in the vehicle.

For the vehicle, I prefer an oil varnish containing no drier, although the drier may be included in the varnish, if desired. Other transparent vehicles such as shellac or lacquer may be used for the vehicle provided it is transparent. The term lacquer is intended to include lacquers of the cellulose ester type. The pigment may be incorporated in still other vehicles such as transparent resins or in plastic materials, such as celluloid.

When the material is made into a paint, it is bright red in color and has good covering qualities, and when the foundation upon which the composition is spread is heated to about 65°, the paint loses its bright red color and takes on a brown tint.

Although I have described the specific embodiment of my invention, I do not wish to be limited thereto as modifications of my invention will suggest temselves to those skilled in the art without departing from the spirit of my invention as defined in the annexed claims.

I claim as my invention:

1. A heat-responsive material comprising a vehicle and a composition including about thirty parts cuprous iodide and about seventy parts mercuric iodide.

2. A heat-responsive material comprising a waterproof vehicle and a composition including about thirty parts cuprous iodide and about seventy parts mercuric iodide.

3. A heat-responsive material comprising a liquid waterproof vehicle and a composition including about thirty parts cuprous iodide and about seventy parts mercuric iodide.

4. A heat-responsve material comprising an oil varnish having incorporated therewith a composition including about thirty parts cuprous iodide and about seventy parts mercuric iodide.

5. The method of making a heat-responsive material which comprises grinding about thirty parts cuprous iodide and about seventy parts mercuric iodide to form a powder and then incorporating said powder in a waterproof vehicle.

6. The method of making a heat-responsive paint which comprises grinding about thirty parts cuprous iodide and about seventy parts mercuric iodide to form a powder and then mixing the pigment thus formed with an oil varnish.

7. The method of making a heat-responsive paint which comprises grinding about thirty parts cuprous iodide and about seventy parts mercuric iodide thoroughly together to form a powder and then mixing the pigment thus formed with a vehicle in the proportion of about twenty-five parts of the pigment to about seventy-five parts of the vehicle.

In testimony whereof, I have hereunto subscribed my name this 19th day of April, 1927.

PAUL B. COCHRAN.